United States Patent [19]

Lundbom

[11] 3,717,050
[45] Feb. 20, 1973

[54] ENGINE GOVERNOR BYPASS SYSTEM
[75] Inventor: Calvin F. Lundbom, Southfield, Mich.
[73] Assignee: General Motors Corporation, Detroit, Mich.
[22] Filed: Sept. 1, 1971
[21] Appl. No.: 176,861

[52] U.S. Cl. .................74/859, 123/97 R, 123/103 A
[51] Int. Cl......B60k 21/00, F02d 31/00, F02d 11/08
[58] Field of Search................................74/856–860

[56] References Cited

UNITED STATES PATENTS

| | | | |
|---|---|---|---|
| 2,234,392 | 3/1941 | Tibbetts | 74/857 |
| 2,708,979 | 5/1955 | Reynoldson | 123/103 A X |
| 3,018,766 | 1/1962 | Francis | 123/103 R UX |
| 3,245,281 | 4/1966 | Smitley et al. | 74/859 |

Primary Examiner—Arthur T. McKeon
Attorney—J. L. Carpenter et al.

[57] ABSTRACT

In a vehicle having a power train including an engine and an automatic transmission wherein an engine governor operates to limit maximum vehicle speed there is provided a bypass system which is controlled by the transmission to bypass the engine governor to enable engine speeds in excess of the governed speed to permit transmission shifts that would otherwise not be permitted.

4 Claims, 1 Drawing Figure

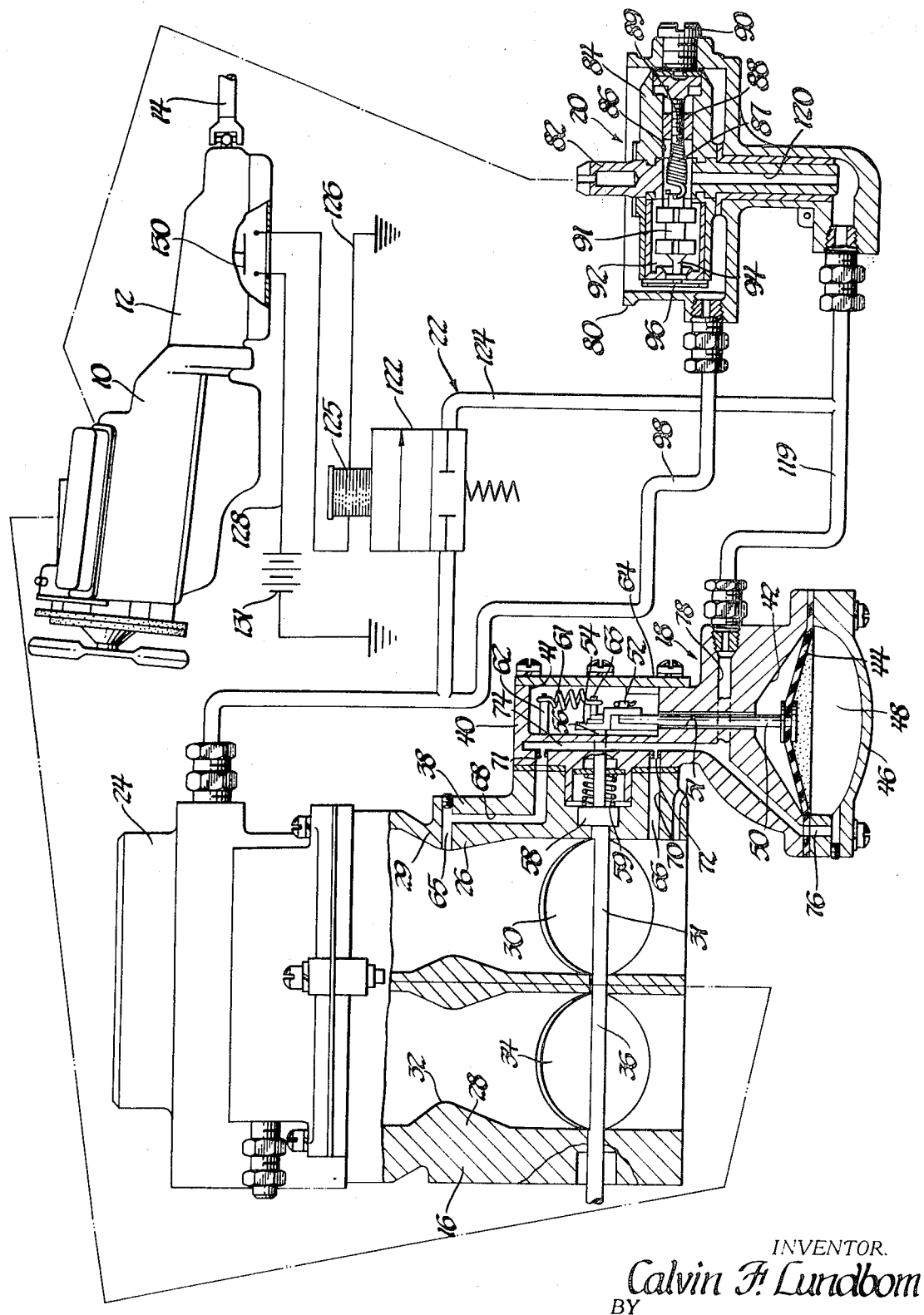

ENGINE GOVERNOR BYPASS SYSTEM

This invention relates to an engine governor bypass system and more particularly to an engine governor bypass system controlled by an automatic transmission to bypass the normal operation of an engine governor.

In certain engine-automatic transmission-vehicle combinations wherein an engine governor is used to limit vehicle speed, automatic shifting between the transmission's drives is prevented at those throttle conditions where the engine speed required to effect such shifting is higher than the maximum engine speed permitted by the governor. For example, where a full throttle shift point occurs at a speed above the maximum engine speed permitted by the engine governor, the transmission is prevented from such shift even though the vehicle speed is less than the maximum vehicle speed permitted by the engine governor by its control of engine speed.

The engine governor bypass system according to the present invention is controlled by an automatic transmission to bypass the engine governor to enable transmission shifting at engine speeds above the normal governed speed but below that which causes vehicle speed to exceed the limit normally imposed by the engine governor. The bypass system is operated by an ignition timing control switch existing in a conventional transmission to control the bypass system to bypass the engine governor in the transmission's low speed drives to permit transmission shifting at those shift point speeds in excess of the maximum engine speed permitted by the governor but at vehicle speeds lower than the limit normally imposed by the engine governor.

An object of the present invention is to provide a new and improved engine governor bypass system to permit transmission shifting at engine speeds which would otherwise not be permitted to occur by an engine governor.

Another object is to provide an engine governor bypass system controlled by an automatic transmission to bypass an engine governor to enable transmission shifting at engine speeds above the normal governed speed while not exceeding the vehicle speed limit normally imposed by the governor.

Another object is to provide an engine governor bypass system that is operated by a switch in the transmission whose operation in turn is controlled by the transmission drive condition to bypass the engine governor to permit transmission shifting at shift points occurring at engine speeds above the normal governed speed while not exceeding the vehicle speed limit normally imposed by the engine governor.

These and other objects of the present invention will be more apparent from the following description and drawing in which:

There is shown a vehicle power train with the engine and transmission in elevation, the engine's carburetor and governor in enlarged section and a bypass system according to the present invention in diagrammatic form.

Referring to the drawing, the bypass system according to the present invention is shown for use in a vehicular power train comprising an engine 10 which delivers power to an automatic transmission 12 which in turn delivers power via a propshaft assembly 14 and then a differential to the vehicle's driving wheels, the latter two components not being shown. The engine 10 has a multiple barrel carburetor 16 which is controlled by a governor comprising a vacuum motor 18 and a governor valve 20 which normally operates to limit engine speed and thereby limit maximum vehicle speed to a predetermined value. Before proceeding to the detailed description of the engine governor bypass system which is generally designated as 22, the details and operation of the carburetor, engine governor and transmission will be described.

The carburetor 16 is of the four barrel type with an air intake 24 having two primary barrels 26 of which only one is shown and two secondary barrels 28 of which only one is shown. Each primary barrel 26 is provided with a venturi throat 29 and a primary throttle valve 30 downstream thereof. Valve 30 is mounted on a shaft 31 that extends through the other primary barrel, not shown, in which is mounted on this shaft a throttle valve identical to throttle valve 30. The operator controls the primary throttle valves by linkage, not shown, connected to the left end of the primary throttle shaft 31. Each secondary barrel 28 is also provided with a venturi throat 32 and a secondary throttle valve 34 downstream thereof. Valve 34 is mounted on a shaft 36 that extends through the other secondary barrel in which is mounted on this shaft another throttle valve identical to valve 34. A secondary throttle valve vacuum motor, not shown, is connected to operate the secondary throttle shaft 36, this latter device being operated by primary and/or secondary venturi vacuum to open the secondary throttle valve 34 as such vacuum increases on increasing primary throttle valve opening.

The vacuum motor 18 is for controlling the throttle valves and is mounted on the carburetor's body 38 and comprises a housing 40 having a pair of recesses 41 and 42. The recess 42 is covered by a flexible diaphragm 44 which is secured at its perimeter to the housing 40 by a cover plate 46. Plate 46 in cooperation with diaphragm 44 provides a chamber 48.

A rod 50 is secured at its lower end to the center of the diaphragm 44, passes through a passage 51 in the housing 40 and has a rightwardly extending upper end 52 which is pivotally connected to a lever 54. Lever 54 is rigidly secured to the right-hand end 56 of the primary throttle shaft 31 which extends into the recess 41. The shaft 31 is mounted at this end in an antifriction bearing 58 and a spring 59 is disposed between this bearing and a washer as shown to provide a seal. A tension spring 61 attached between a pin 62 on the housing 40 and a pin 63 on lever 54 tends to hold the primary throttle valve 30 in the open position. A cover plate 64 is secured to the housing 40 to cover the recess 41 to protect the mechanism therein.

An orifice 65 at the primary venturi throat 29 and an orifice 66 downstream of the primary throttle valve 30 are connected by passages 68 and 70 having flow restrictions 71 and 72, respectively, with a passage 74 in housing 40. Passage 74 is connected to a passage 76 in cover plate 46 which leads to chamber 48. A passage 78 connecting with passage 74 terminates in an opening in the housing 40.

The governor valve 20 is for controlling the throttle valve motor 18 and comprises a stationary housing 80 which is adapted to be mounted on the engine 10 and rotatably supports a shaft 82. Shaft 82 is driven in any suitable manner in proportion to engine vehicle speed such as being connected to be driven by the distributor shaft, not shown. Mounted for rotation with shaft 82 is a laterally extending valve body 84 having a bore 86 in which is located a spring 87 that is attached at one end to an internally threaded member 88 which is keyed in the bore. The rightward end of spring 87 is adjustable axially of the bore 86 by turning of an adjacent screw 89 which engages member 88 and is reached by removing an access screw plug 90. The other end of spring 87 is secured to a governor weight 91 which is movable axially within a chamber 92 against the spring and has at the free end thereof a valve portion 94 adapted to close an orifice 96 when the weight is forced radially outward due to the rotation of the shaft 82 and valve body 84 in accordance with engine speed. The engine speed at which the orifice 96 is closed is dependent, of course, upon the adjustment of spring 87 and the mass of the governor weight 91.

A vacuum balancing air bleed is provided through the governor valve 20 to chamber 48 of the vacuum motor 18 when the orifice 96 is uncovered. A conduit 98 connects the air intake 24 of carburetor 16 to the interior of housing 80 and a conduit 119 connects the latter to passage 78 in the motor housing 40. When the engine is operating at a speed insufficient to close the orifice 96 of governor valve 20, engine vacuum will draw clean air through the conduit 98 into the housing 80, through the orifice 96 and into the chamber 92, through the bore 86 and an axial passage 120 in the shaft 82 and thence through the conduit 119 to passage 78. This prevents a vacuum from developing in chamber 48 of the motor 18 so that there is no vacuum motor force tending to close the primary throttle valves. When the engine reaches governed speed, the orifice 96 is closed and the air bleed through the conduit 119 is cut off. When this occurs, vacuum is developed in chamber 48 and urges the diaphragm 44 downwardly against the force of spring 61 to close the primary throttle valves to provide governoring action to limit engine speed.

The carburetor 16, the vacuum motor 18, and the governor valve 20 thus far described are conventional and operate to govern the engine speed to limit the maximum vehicle speed as will be well understood by those skilled in this art. Furthermore, the automatic transmission 12 is of a conventional type. For example, the transmission may be like that in U.S. Pat. to Winchell et al. No. 3,321,056 which provides three forward drives, namely a low, intermediate and a high speed drive with the high speed drive being a direct drive. Knowing the vehicle speed limit desired, the maximum engine speed is limited by the governor to that speed in the highest speed transmission drive which produces the vehicle speed limit. In certain applications with automatic shifting transmissions like Winchell et al., shifts between low and intermediate drive and from intermediate to high drive can only occur at an engine speed exceeding the governed engine speed at certain throttle conditions such as wide open throttle. This prevention of transmission shifting because of too low an engine speed to effect the shift thus occurs even though the vehicle speed is below the desired limit.

The engine governor bypass system 22 according to the present invention bypasses the engine governor except in the transmission's direct drive and comprises a solenoid operated bypass valve 122 which is normally spring biased to a closed position as shown to block a bypass conduit 124 that would otherwise connect the conduit 98 directly to the conduit 119 and thus bypass the governor valve 20. The valve's solenoid 125 is connected by a conductor 126 to ground and is connected via a conductor 128 and a switch 130 to the vehicle's electrical power source which is the battery 131. The solenoid 125 when energized with switch 130 closed operates to position valve 122 to open the conduit 124 to bypass the governor valve 20 so that the chamber 48 of the engine governor vacuum motor 18 is not evacuated even when governor valve 20 is closed. Thus the engine may exceed the governed speed regardless of whether governor valve 20 is closed when the bypass valve 122 is open.

The switch 130 is controlled automatically to permit shifting which otherwise could not occur but does not enable the vehicle to exceed the maximum speed desired. In transmissions of the type of Winchell et al., it is current practice to employ a switch referred to as a transmission controlled spark or TCS switch which, as disclosed in U.S. Pat. to Tooker et al. No. 3,584,521, is used in an ignition timing control to control engine ignition timing according to the transmission drive that is in effect. In such installations the TCS switch is closed in the low and intermediate drives and is open in the high or direct drive. According to the present invention the TCS switch serves as the switch 130 with the advantage that this switch then serves a dual purpose. With the switch 130 being the TCS switch, the solenoid circuit is closed in the low and intermediate transmission drive and thus in these drives the conduit 124 is opened by the bypass valve 122 to bypass the engine governor valve 20. Thus, the transmission can shift between low and intermediate and from intermediate to high drive when engine speed is required to exceed the normally engine governed speed for such shifting to occur. In low and intermediate drive the highest engine speed required for such shifting does not exceed a speed that would produce a vehicle speed in excess of the maximum speed desired and thus the vehicle speed limit is not exceeded even though the engine governor is bypassed. In such an installation and in high drive where the maximum vehicle speed could be exceeded without engine governing the TCS switch 130 is open and thus the bypass valve 122 is deenergized to close or block the bypass so that the governor valve 20 is then effective to govern engine speed.

The above described embodiment is illustrative of the invention which may be modified within the scope of the appended claims.

I claim:

1. An engine, a carburetor for inducting air and fuel to said engine, an automatic shifting transmission powered by said engine and operable to provide a plurality of different transmission drives, engine governor means for controlling said carburetor to limit engine speed to a predetermined value, and engine governor bypass means controlled by said transmission for bypassing said engine governor means in a low speed drive to permit engine speed in excess of the governed speed to enable shifting from said low speed drive to another drive at an engine speed in excess of the governed speed.

2. An engine, a carburetor for inducting air and fuel to said engine, an automatic shifting transmission powered by said engine and operable to provide a plurality of different transmission drives including a low speed drive and a high speed drive, engine governor means for controlling said carburetor to limit engine speed to a predetermined value, and engine governor bypass means for bypassing said engine governor means to permit engine speed in excess of the governed speed, said engine governor bypass means including a switch having an open condition and a closed condition and operated by said transmission to be in one condition in said low speed drive and in the other condition in said high speed drive to control said engine governor bypass means to bypass said engine governor means to permit engine speed in excess of the governed speed in said low speed drive to enable shifting from said low speed drive to said high speed drive at an engine speed in excess of the governed speed.

3. An engine, a carburetor including a throttle valve for inducting air and fuel to said engine, an engine governor system comprising a throttle valve control motor connected to operate said throttle valve and a governor valve connected to be controlled by engine speed and connected to control said motor to operate said throttle valve to limit engine speed to a predetermined value, an automatic shifting transmission powered by said engine and operable to provide a plurality of different transmission drives including a low speed drive and a high speed drive, and engine governor bypass means comprising a bypass valve operable in a bypass condition to bypass said governor valve so that said throttle valve control motor is not effective to limit engine speed and operable in a non-bypass condition to permit said governor valve to control said throttle valve control motor, biasing means for biasing said bypass valve to said non-bypass condition, an electrical circuit having a solenoid operable on energization to condition said bypass valve in said bypass condition, said circuit including a switch operable when closed to energize said solenoid and when open to deenergize said solenoid and being operated by said transmission to be in one switch condition in said low speed drive and in the other switch condition in said high speed drive to control the energization of said solenoid to condition said bypass valve in said bypass condition in said low speed drive and in said non-bypass condition in said high speed drive.

4. An engine, a carburetor including a throttle valve for inducting air and fuel to said engine, an engine governor system comprising a throttle valve control motor connected to operate said throttle valve and a governor valve connected to be controlled by engine speed and connected to control said motor to operate said throttle valve to limit engine speed to a predetermined value, an automatic shifting transmission powered by said engine and operable to provide a plurality of different transmission drives including a low speed drive and a high speed drive, and engine governor bypass means comprising a bypass valve operable in an open condition to bypass said governor valve so that said throttle valve control motor is not effective to limit engine speed and in a closed condition to permit said governor valve to control said throttle valve control motor, biasing means for biasing said bypass valve to said closed condition, and an electrical circuit having a solenoid operable on energization to condition said bypass valve in said open condition, said circuit including a switch operable when closed to energize said solenoid and when open to deenergize said solenoid and being operated by said transmission to be in said closed switch condition in said low speed drive and in said open switch condition in said high speed drive to thereby control the energization of said solenoid to condition said bypass valve in said open valve condition in said low speed drive and in said closed valve condition in said high speed drive.

* * * * *